(12) United States Patent
Mishra et al.

(10) Patent No.: US 11,256,637 B2
(45) Date of Patent: Feb. 22, 2022

(54) LEGACY-COMPATIBLE 8-BIT ADDRESSING ON RFFE BUS FOR INCREASED DEVICE CONNECTIONS

(71) Applicant: QUALCOMM Incorporated, San Diego, CA (US)

(72) Inventors: Lalan Jee Mishra, San Diego, CA (US); Richard Dominic Wietfeldt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 16/829,163

(22) Filed: Mar. 25, 2020

(65) Prior Publication Data

US 2021/0303489 A1 Sep. 30, 2021

(51) Int. Cl.
*G06F 13/20* (2006.01)
*G06F 13/42* (2006.01)
*H04B 1/38* (2015.01)

(52) U.S. Cl.
CPC .......... *G06F 13/20* (2013.01); *G06F 13/4282* (2013.01); *H04B 1/38* (2013.01)

(58) Field of Classification Search
CPC ........ G06F 13/20; G06F 13/4282; H04B 1/38
See application file for complete search history.

(56) References Cited

U.S. PATENT DOCUMENTS

| | | | |
|---|---|---|---|
| 2017/0124008 A1* | 5/2017 | Chen | G06F 13/4022 |
| 2017/0212850 A1* | 7/2017 | Mishra | H04L 12/403 |
| 2017/0255588 A1* | 9/2017 | Pitigoi-Aron | G06F 13/364 |
| 2019/0073327 A1* | 3/2019 | Mishra | G06F 13/4291 |
| 2019/0163649 A1* | 5/2019 | Mishra | G06F 3/0659 |
| 2019/0227962 A1* | 7/2019 | O'Shea | G06F 13/20 |
| 2019/0227971 A1* | 7/2019 | O'Shea | G06F 13/4282 |
| 2019/0346876 A1* | 11/2019 | Chen | G06F 1/10 |

* cited by examiner

*Primary Examiner* — Nimesh G Patel
(74) *Attorney, Agent, or Firm* — Qualcomm Incorporated

(57) ABSTRACT

Systems, methods, and apparatus increase the number of slave devices that can be connected to a serial bus. The bus protocol may be an RFFE protocol, an SPMI protocol, an I3C protocol or another protocol usable on a serial bus. In various aspects of the disclosure, a method performed at a device coupled to a serial bus includes receiving a first datagram at a slave device coupled to a serial bus, where the first datagram includes a 4-bit broadcast address indicative of a broadcast datagram, a first command directed to an invalid register address, and a payload, determining an encapsulation protocol associated with the invalid register address, and responding to a second command carried in the payload when an 8-bit slave address in the payload matches an 8-bit slave identifier allocated to the slave device.

30 Claims, 13 Drawing Sheets

RFFE Register Space

| Page# | Address Region | Register Count | Assignment |
|---|---|---|---|
| Page-00 | 0x0000 – 0x001B | 28 | User Defined |
|  | 0x001C – 0x003F | 36 | Reserved for MIPI-RFFE Specification usage |
|  | 0x0040 – 0x00FF | 192 | User Defined |
| Page-01 | 0x0100 – 0x01FF | 256 | User Defined |
| Page-02 | 0x0100 – 0x01FF | 256 | User Defined |
| Page-03 | 0x0100 – 0x01FF | 256 | User Defined |
| ... | ... | ... | ... |
| Page-254 | 0x0100 – 0x01FF | 256 | Reserved |
| Page-255 | 0x0100 – 0x01FF | 256 | Reserved |

Number of pages: 256
Registers in each page: 256
Total possible registers: 64k

LEGACY-COMPATIBLE 8-BIT ADDRESSING ON RFFE BUS FOR INCREASED DEVICE CONNECTIONS

TECHNICAL FIELD

The present disclosure relates generally to serial communication over a shared serial bus and, more particularly, to increasing addressable device count on a shared bus.

BACKGROUND

Mobile communication devices may include a variety of components including circuit boards, integrated circuit (IC) devices and/or System-on-Chip (SoC) devices. The components may include processing devices, user interface components, storage and other peripheral components that communicate through a shared data communication bus, which may include a multi-drop serial bus or a parallel bus. General-purpose serial interfaces known in the industry include the Inter-Integrated Circuit (I2C or I²C) serial interface and its derivatives and alternatives.

The Mobile Industry Processor Interface (MIPI) Alliance defines standards for the Improved Inter-Integrated Circuit (I3C) serial interface, the Radio Frequency Front-End (RFFE) interface, the System Power Management Interface (SPMI) and other interfaces. These interfaces may be used to connect processors, sensors and other peripherals, for example. In some interfaces, multiple bus masters are coupled to the serial bus such that two or more devices can serve as bus master for different types of messages transmitted on the serial bus. The RFFE interface defines a communication interface that can be for controlling various radio frequency (RF) front-end devices, including power amplifier (PA), low-noise amplifiers (LNAs), antenna tuners, filters, sensors, power management devices, switches, etc. These devices may be collocated in a single IC device or provided in multiple IC devices. In a mobile communication device, multiple antennas and radio transceivers may support multiple concurrent RF links. SPMI protocols define a hardware interface that may be implemented between baseband or application processors and peripheral components. In some instances, SPMI protocols are implemented to support power management operations within a device.

In many instances, a multi-drop serial bus may be capable of supporting large numbers of devices that implement high-speed, complex applications. The addressing scheme defined by certain standards and protocols governing bus operation may be inadequate to facilitate efficient device operations in some advanced applications.

SUMMARY

Certain aspects of the disclosure relate to systems, apparatus, methods and techniques that can compensate for an inadequate number of available slave addresses, enabling additional slave devices to be connected to a single serial bus. According to certain aspects, existing bus protocols can be leveraged to expand addressing capabilities and to increase the number of slave devices that can be concurrently connected to the serial bus, while maintaining compatibility with the bus protocols, and/or while providing for coexistence with conventional slave devices. An encapsulation protocol compliant with, compatible with, or otherwise usable with the bus protocol is provided in accordance with certain aspects of this disclosure, where the encapsulation protocol supports an 8-bit slave address that can be preassigned or programmed during system initialization or operation. The bus protocol may be an RFFE protocol, an SPMI protocol, an I3C protocol or another protocol usable on a serial bus.

In various aspects of the disclosure, a method performed at a device coupled to a serial bus includes receiving a first datagram at a slave device coupled to a serial bus, where the first datagram includes a 4-bit broadcast address indicative of a broadcast datagram, a first command directed to an invalid register address, and a payload, determining an encapsulation protocol associated with the invalid register address, and responding to a second command carried in the payload when an 8-bit slave address in the payload matches an 8-bit slave identifier allocated to the slave device.

In certain aspects, the invalid register address indicates a page of registers that is unimplemented in the slave device. The invalid register address may point to a memory location that is unavailable for reading or writing.

In certain aspects, the serial bus is operated in accordance with a Radio Frequency Front-End protocol and each bit of the 4-bit broadcast address has a zero value. The second command may be defined by a Radio Frequency Front-End protocol. The first command is defined by a Radio Frequency Front-End protocol and the second command is defined by the encapsulation protocol. The first command may be defined by a System Power Management Interface protocol.

In certain aspects, the method includes writing a data byte received in the payload to a target register address provided in the payload when the second command is a write command. The method may include reading a data byte from a register identified by a target address provided in the payload when the second command is a read command, and transmitting the data byte over the serial bus as part of the payload. The method may include receiving a second datagram at the slave device, the second datagram including the 4-bit broadcast address and a write command directed to a valid register address, and using the valid register address to write payload data to one or more registers.

In various aspects of the disclosure, an apparatus includes an interface circuit adapted to couple the apparatus to a serial bus, and a processor. The processor may be configured to receive a first datagram at a slave device coupled to the serial bus, where the first datagram includes a 4-bit broadcast address indicative of a broadcast datagram, a first command directed to an invalid register address, and a payload, determine an encapsulation protocol associated with the invalid register address, and respond to a second command carried in the payload when an 8-bit slave address in the payload matches an 8-bit slave identifier allocated to the slave device.

In various aspects of the disclosure, a processor-readable storage medium stores code for receiving a first datagram at a slave device coupled to a serial bus, where the first datagram includes a 4-bit broadcast address indicative of a broadcast datagram, a first command directed to an invalid register address, and a payload, determining an encapsulation protocol associated with the invalid register address, and responding to a second command carried in the payload when an 8-bit slave address in the payload matches an 8-bit slave identifier allocated to the slave device.

In various aspects of the disclosure, an apparatus includes means for receiving datagrams from a serial bus, configured to receive a first datagram at a slave device coupled to a serial bus, where the first datagram includes a 4-bit broadcast address indicative of a broadcast datagram, a first command directed to an invalid register address, and a payload, means for determining an encapsulation protocol associated with the invalid register address, and means for responding to a second command carried in the payload when an 8-bit slave address in the payload matches an 8-bit slave identifier allocated to the slave device.

BRIEF DESCRIPTION OF THE DRAWINGS

FIG. 6 illustrates a memory map that summarizes the structure of the register space addressable through a serial bus that is operated in accordance with RFFE protocols.

DETAILED DESCRIPTION

Figure 1:
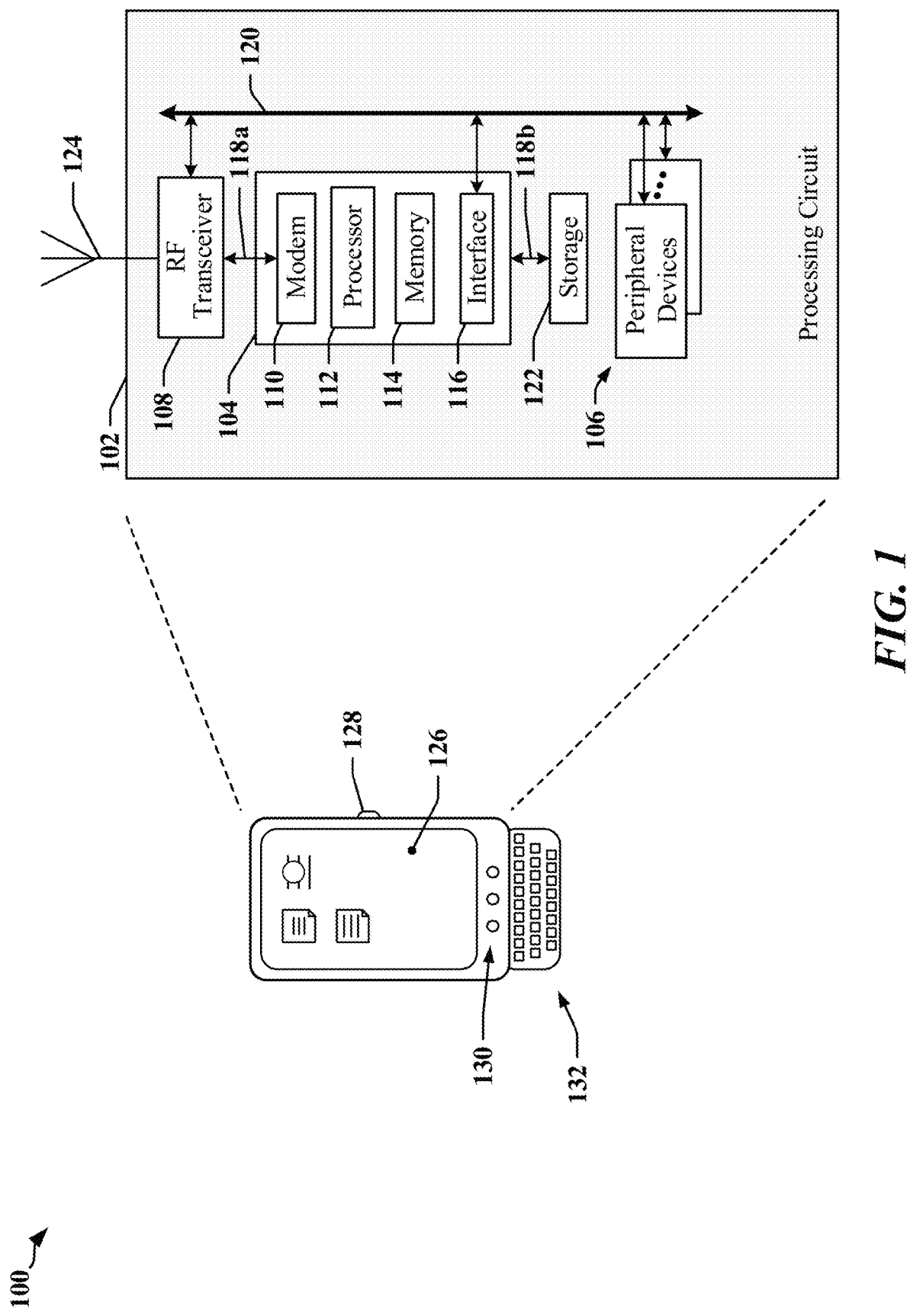
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoC and other IC devices often employ a shared communication interface that may include a serial bus or other data communication link to connect processors with modems and other peripherals. The serial bus or other data communication link may be operated in accordance with multiple standards or protocols defined. For example, the serial bus may be operated in accordance with an I2C, I3C, SPMI, and/or RFFE protocol, or other protocol that may be configured for half-duplex operation. Increased functionality and complexity of operations involving devices coupled to serial buses, together with the use of greater numbers of peripherals, radio-frequency front-end devices and/or sensors device in support of complex applications can result in a shortages of available unique addresses that can be assigned to slave devices.

Certain aspects of the disclosure relate to techniques for expanding the number of slave devices that can be coupled to a serial bus with an ability to be individually addressed. A method performed at a device coupled to a serial bus includes receiving a first datagram at a slave device coupled to a serial bus, where the first datagram includes a 4-bit broadcast address indicative of a broadcast datagram, a first command directed to an invalid register address, and a payload, determining an encapsulation protocol associated with the invalid register address, and responding to a second command carried in the payload when an 8-bit slave address in the payload matches an 8-bit slave identifier allocated to the slave device.

The invalid register address may point to a page of registers that is unimplemented in the slave device, and/or may point to a memory location that is unavailable for reading or writing. The serial bus may be operated in accordance with an RFFE protocol, an SPMI protocol or another protocol. In one example, each bit of the 4-bit broadcast address has a zero value. The first command may be defined by an RFFE protocol, an SPMI protocol or another protocol. The second command may be defined by an RFFE protocol, an SPMI protocol or another protocol. The second command may be defined by the encapsulation protocol.

In one example, a data byte received in the payload may be written to a target register address provided in the payload when the second command is a write command. In this example, the target register address is a valid address. In another example, a data byte may be read from a register identified by a valid target address provided in the payload when the second command is a read command, and the data byte may be transmitted over the serial bus as part of the payload.

Certain aspects disclosed herein may be applicable to a serial bus operated in accordance with SPMI protocols, RFFE protocols, I3C protocols, I2C protocols, and/or or another bus protocol. Certain aspects are applicable to a serial bus operated in half-duplex mode or full-duplex mode. Certain aspects are applicable to multipoint interfaces and/or interfaces operated in point-to-point mode.

Examples of Apparatus that Employ Serial Data Links

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include an SoC a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
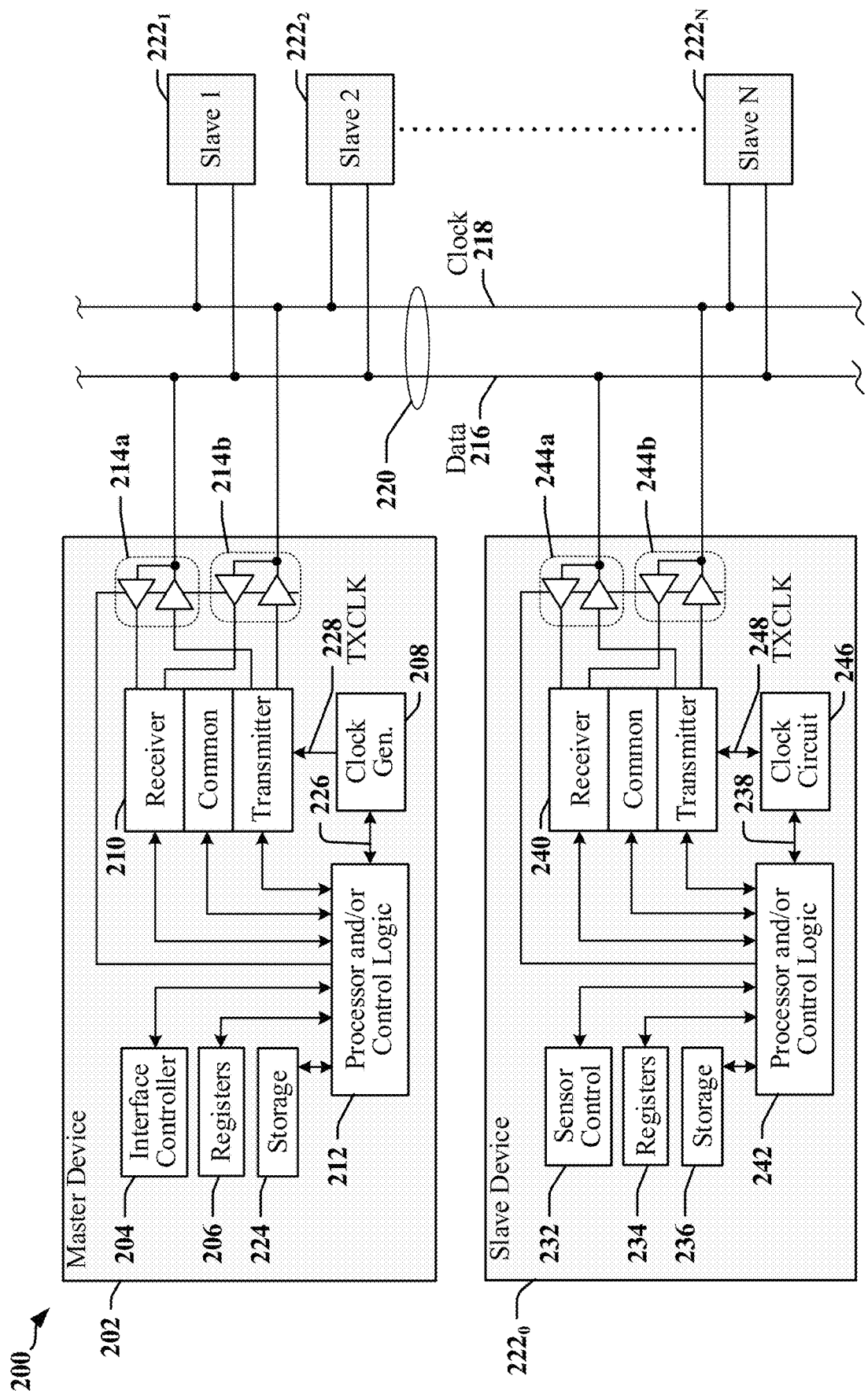
FIG. 2 illustrates a system architecture for an apparatus employing a data link between IC devices.

FIG. 2 illustrates certain aspects of an apparatus 200 that includes multiple devices 202, and $222_0$-$222_N$ coupled to a serial bus 220. The devices 202 and $222_0$-$222_N$ may be implemented in one or more semiconductor IC devices, such as an application processor, SoC or ASIC. In various implementations the devices 202 and $222_0$-$222_N$ may include, support or operate as a modem, a signal processing device, a display driver, a camera, a user interface, a sensor, a sensor controller, a media player, a transceiver, RFFE devices, and/or other such components or devices. In some examples, one or more of the slave devices $222_0$-$222_N$ may be used to control, manage or monitor a sensor device. Communication between devices 202 and $222_0$-$222_N$ over the serial bus 220 is controlled by a bus master 202. Certain types of bus can support multiple bus masters 202.

In one example, a master device 202 may include an interface controller 204 that manages access to the serial bus, configures dynamic addresses for slave devices $222_0$-$222_N$ and/or causes a clock signal 228 to be transmitted on a clock line 218 of the serial bus 220. The master device 202 may include configuration registers 206 or other storage 224, and other control logic 212 configured to handle protocols and/or higher level functions. The control logic 212 may include a processing circuit such as a state machine, sequencer, signal processor or general-purpose processor. The master device 202 includes a transceiver 210 and line drivers/receivers 214a and 214b. The transceiver 210 may include receiver, transmitter and common circuits, where the common circuits may include timing, logic and storage circuits and/or devices. In one example, the transmitter encodes and transmits data based on timing in the clock signal 228 provided by a clock generation circuit 208. Other timing clocks 226 may be used by the control logic 212 and other functions, circuits or modules.

At least one device $222_0$-$222_N$ may be configured to operate as a slave device on the serial bus 220 and may include circuits and modules that support a display, an image sensor, and/or circuits and modules that control and communicate with one or more sensors that measure environmental conditions. In one example, a slave device $222_0$ configured to operate as a slave device may provide a control function, module or circuit 232 that includes circuits and modules to support a display, an image sensor, and/or circuits and modules that control and communicate with one or more sensors that measure environmental conditions. The slave device $222_0$ may include configuration registers 234 or other storage 236, control logic 242, a transceiver 240 and line drivers/receivers 244a and 244b. The control logic 242 may include a processing circuit such as a state machine, sequencer, signal processor or general-purpose processor. The transceiver 210 may include receiver, transmitter and common circuits, where the common circuits may include timing, logic and storage circuits and/or devices. In one example, the transmitter encodes and transmits data based on timing in a clock signal 248 provided by clock generation and/or recovery circuits 246. The clock signal 248 may be derived from a signal received from the clock line 218. Other timing clocks 238 may be used by the control logic 242 and other functions, circuits or modules.

The serial bus 220 may be operated in accordance with an I2C protocol, I3C protocol, RFFE protocol, SPMI protocol, or another protocol. At least one device 202, $222_0$-$222_N$ may be configured to selectively operate as either a master device or a slave device on the serial bus 220. Two or more devices 202, $222_0$-$222_N$ may be configurable to operate as a master device on the serial bus 220.

In some implementations, the serial bus 220 may be operated in accordance with an I3C protocol. Devices that communicate using the I3C protocol can coexist on the same serial bus 220 with devices that communicate using I2C protocols. The I3C protocols may support different communication modes, including a single data rate (SDR) mode that is compatible with I2C protocols. High-data-rate (HDR) modes may provide a data transfer rate between 6 megabits per second (Mbps) and 16 Mbps, and some HDR modes may be provide higher data transfer rates. I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 220, in addition to data formats and aspects of bus control. In some aspects, the I2C and I3C protocols may define direct current (DC) characteristics affecting certain signal levels associated with the serial bus 220, and/or alternating current (AC) characteristics affecting certain timing aspects of signals transmitted on the serial bus 220. In some examples, a 2-wire serial bus 220 transmits data on a data line 216 and a clock signal on the clock line 218. In some instances, data may be encoded in the signaling state, or transitions in signaling state of the data line 216 and the clock line 218.

In some conventional systems, multiple serial buses are provided to support demands for high data throughput, low latency, high bus availability and/or for other reasons. In some instances, multiple serial buses are used to alleviate issues cause by limited addressing capabilities of serial bus protocols. By way of example, FIGS. 3 and 4 illustrate systems in which multiple serial buses may be employed to interconnect master and slave devices.

Figure 3:
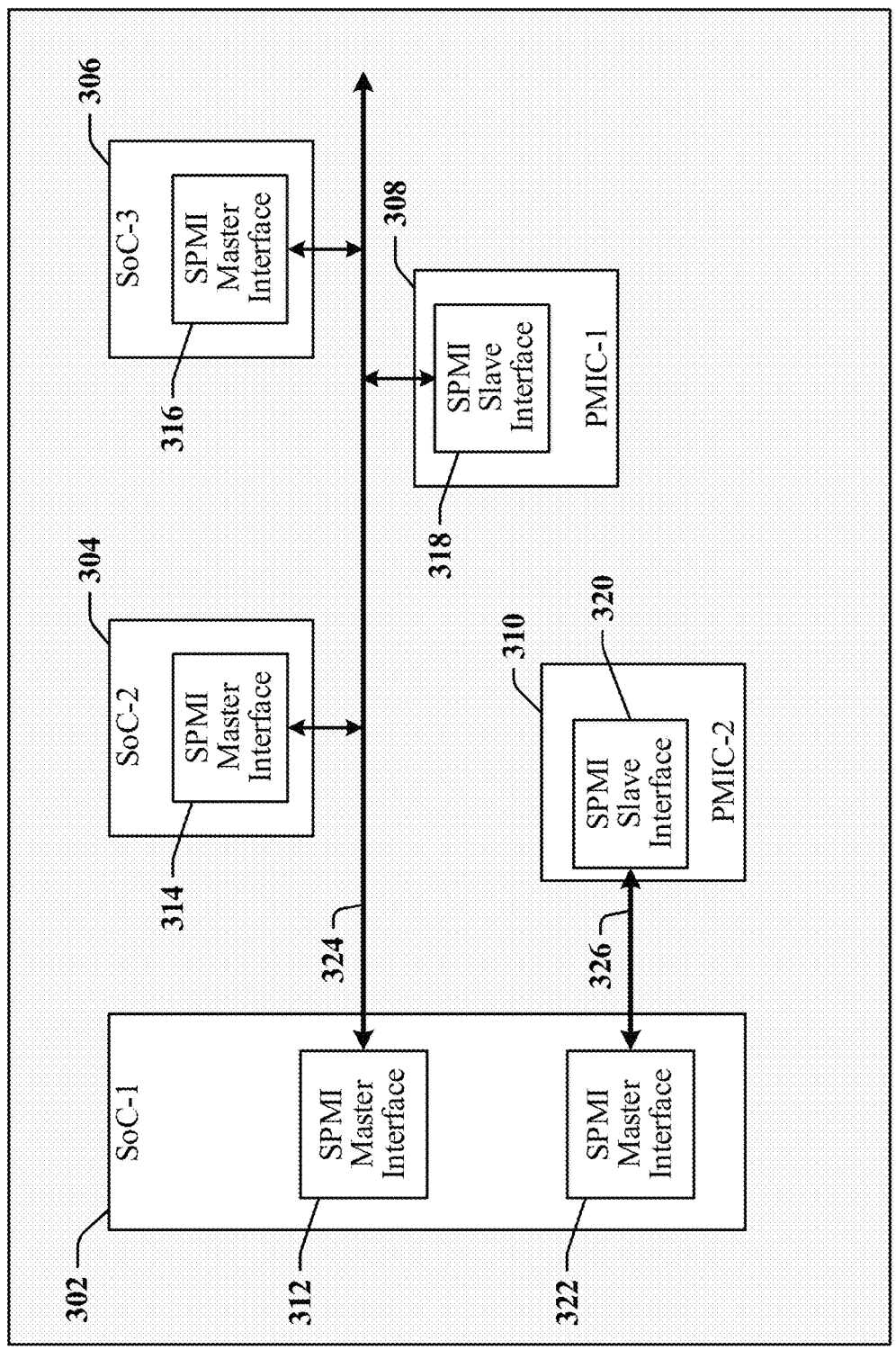
FIG. 3 illustrates a device that employs an SPMI bus to couple various front-end devices in accordance with certain aspects disclosed herein.

FIG. 3 illustrates an example of a system 300 that may have one or more serial buses 324, 326 operated in accordance with I2C, I3C, RFFE, SPMI, and/or another bus protocol. In one example, SPMI protocols may be used to provide a power management control bus that can communicate commands to cause circuits and/or functional components to reset, sleep, shutdown, wakeup, and so on. In some implementations, I2C, I3C, RFFE, SPMI, and/or other bus protocols may be used to implement a general-purpose communication link. In the illustrated example, a two-wire serial bus 324, 326 may connect multiple slave devices (e.g., the PMICs 308, 310) to one or more devices (e.g. SoCs 302, 304, 306) that can be configured to serve as a master device. In the example of a serial bus controlled in accordance with an SPMI protocol, between one and four master devices may be coupled to the serial bus 324, 326 and up to 16 slave devices may be supported. The serial bus 324, 326 includes a first wire (SCLK) that carries a clock signal and a second wire that carries a data signal (SDATA). Certain bus protocols, including SPMI protocols, support bus contention arbitration, request arbitration and group addressing to permit the PMICs 308, 310 to be written concurrently or simultaneously by a master device (SoCs 302, 304, 306). In some implementations, a bus protocol can support a low-speed mode that operates with a clock frequency of between 32 kHz and 15 MHz, and a high-speed mode that operates with a clock frequency of between 32 kHz and 26 MHz. Slave devices coupled to a serial bus devices may be required to acknowledge certain commands.

In the illustrated example, the system 300 includes three SoCs 302, 304, 306 and two power management integrated circuits (PMICs 308, 310). Other types of peripheral devices may be coupled to a serial bus 324, 326 that is operated in accordance with an SPMI protocol, or another protocol. In the illustrated system 300, a first serial bus 324 couples a bus master 312, 314, 316 on each SoC 302, 304, 306 and a bus slave 318 on a first PMIC 308, and a second serial bus 326 couples a bus slave 320 in a second PMIC 310 to an additional bus master 322 provided in one SoC 302.

Figure 4:
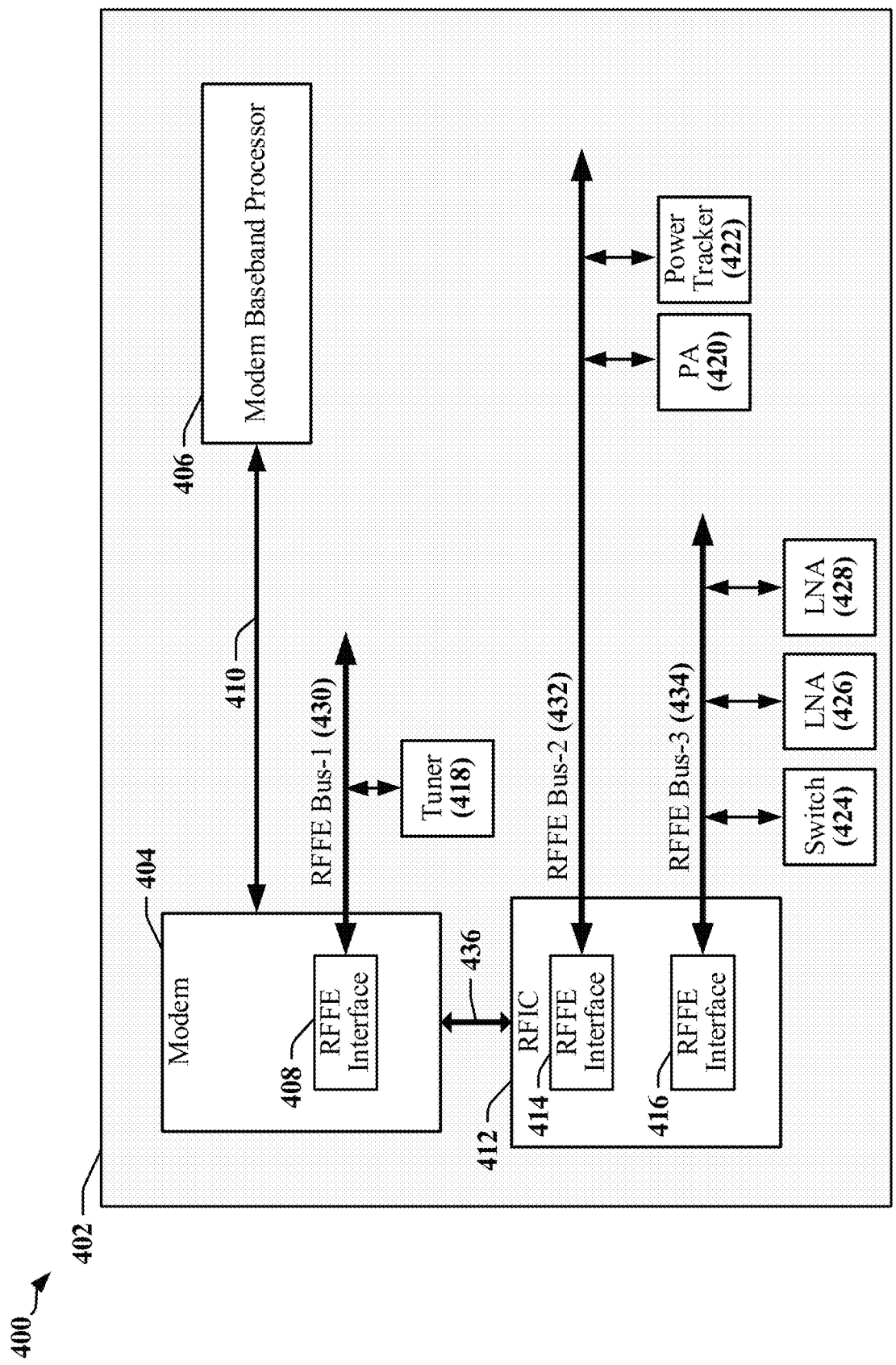
FIG. 4 illustrates a device configuration for coupling various radio frequency front-end devices using multiple RFFE buses in accordance with certain aspects disclosed herein.

FIG. 4 is a diagram 400 illustrating an example of a configuration of communication links in a chipset or device 402 that employs multiple RFFE buses 430, 432, 434 to couple various RF front-end devices 418, 420, 422, 424, 426, 428. In this example, a modem 404 includes an RFFE interface 408 that couples the modem 404 to a first RFFE bus 430. The modem 404 may communicate with a baseband processor 406 and a Radio-Frequency IC (RFIC 412) through respective communication links 410, 436 or, in some implementations, through a common communication link 410 or 436. The illustrated device 402 may be embodied in one or more of a mobile communication device, a mobile telephone, a mobile computing system, a mobile telephone, a notebook computer, a tablet computing device, a media player, a gaming device, a wearable computing device, a wearable communication device, an appliance, or the like.

In various examples, the device 402 may be implemented with one or more baseband processors 406, modems 404, RFICs 412, multiple communication links 410, 436, multiple RFFE buses 430, 432, 434 and/or other types of buses. The device 402 may include other processors, circuits, modules and may be configured for various operations and/or different functionalities. In the example illustrated in FIG. 4, the modem 404 is coupled to an RF tuner 418 through its RFFE interface 408 and the first RFFE bus 430. The RFIC 412 may include one or more RFFE interfaces 414, 416, controllers, state machines and/or processors that configure and control certain aspects of the RF front-end. In the illustrated example, the RFIC 412 communicates with a PA 420 and a power tracking module 422 through a first of its RFFE interfaces 414 and the second RFFE bus 432. In the illustrated example, RFIC 412 communicates with a switch 424 and one or more LNAs 426, 428 through a second of its RFFE interfaces 416 and the third RFFE bus 434.

Bus latency can affect the ability of a serial bus to handle high-priority, real-time and/or other time-constrained messages. Low-latency messages, or messages requiring low bus latency, may relate to sensor status, device-generated real-time events and virtualized general-purpose input/output (GPIO). In one example, bus latency can be measured as the time elapsed between a message becoming available for transmission and the delivery of the message. In another example, bus latency can be measured as the time elapsed between a message becoming available for transmission and commencement of transmission of the message. Other measures of bus latency may be employed. Bus latency typically includes delays incurred while higher priority messages are transmitted, interrupt processing, the time required to terminate a datagram in process on the serial bus, the time to transmit commands causing bus turnaround between transmit mode and receive mode, bus arbitration and/or command transmissions specified by protocol.

In one example, latency-sensitive messages include coexistence messages. Coexistence management (CxM) messages are transmitted in a multisystem platform to prevent or reduce instances of certain types of RFFE device impinging on each other. RFFE devices that may be the source or subject of CxM messages include, for example, switches 424, LNAs 426, 428, PAs 420 and other types of device that operate concurrently in a manner that generates inter-device RF interference, and/or that could potentially cause damage to one or more devices. CxM messages may be exchanged between certain devices that are shared between different radio access technologies, wireless subscriptions and/or applications. For example, a switch 424, LNA 426, 428, PA 420 and/or an antenna may be shared by two different radio access technologies which have different transmit and receive schedules, and damage to an LNA 426, 428 or other device may occur if a device begins transmitting using one radio access technology while receiving using another radio access technology. Devices that can interfere with one another may exchange CxM messages to permit each device to signal imminent actions that may result in interference or conflict. For example, two modems 404 may exchange CxM messages in order to manage the operation of shared components. In conventional systems CxM messages may be exchanged using dedicated serial links, each implemented using a two-wire or four-wire Universal Asynchronous Receiver/Transmitter (UART). In multi-radio, multi-application systems, the CxM interconnects and other device interconnects can consume large numbers of physical input/output (I/O) pins and interconnects adding to cost and routing complexity.

Certain aspects disclosed herein relate to techniques that leverage existing bus protocols to expand addressing capabilities and to increase the number of slave devices that can be concurrently connected to the serial bus, while maintaining compatibility with the bus protocols, and/or while providing for coexistence with conventional slave devices. An encapsulation protocol compliant with, compatible with, or otherwise usable with the bus protocol is provided in accordance with certain aspects of this disclosure, where the encapsulation protocol supports an 8-bit slave address that can be preassigned or programmed during system initialization or operation.

The bus protocol may be an RFFE protocol, an SPMI protocol, an I3C protocol or another protocol that is usable on a serial bus. Protocols that support communication over a multi-drop serial bus may define a datagram structure used to transmit command, control and data payloads within application-defined latency tolerances. Performance and latency of a serial bus may be determined to some degree by datagram structures defined by the protocols used to operate the serial bus. Datagram structures for different protocols define certain common features, including addressing used to select devices to receive or transmit data, clock generation and management, interrupt processing and device priorities. In this disclosure, the example of RFFE and SPMI protocols may be employed to illustrate certain aspects disclosed herein. However, the concepts disclosed herein are applicable to other serial bus protocols and standards. Some similarities exist between RFFE and SPMI datagram structures, and the concepts disclosed herein are applicable to other protocols where different datagram structures may be defined.

Figure 5:
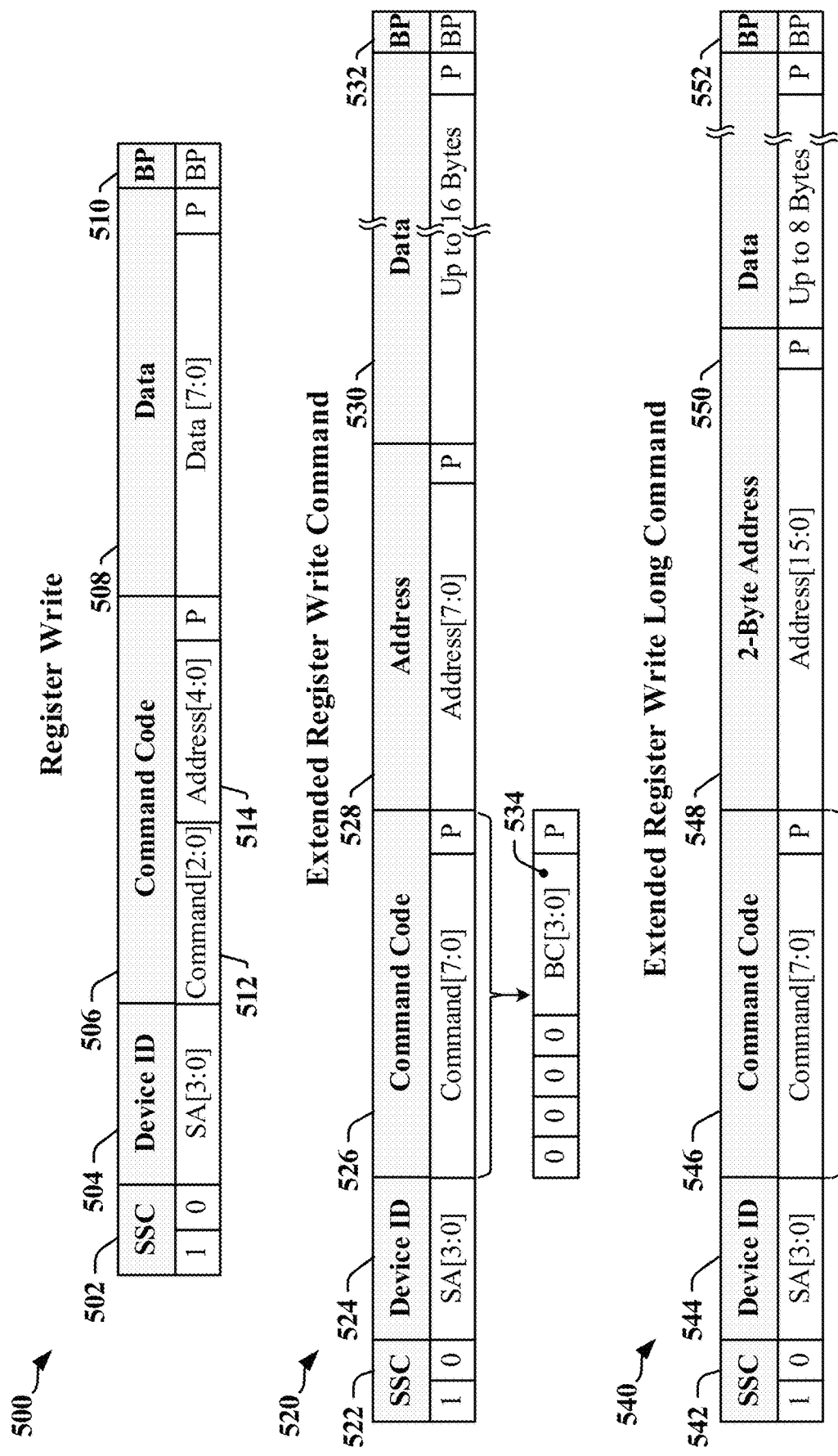
FIG. 5 illustrates datagram structures defined by RFFE protocols that may be adapted in accordance with certain aspects disclosed herein.

FIG. 5 illustrates datagram structures for a Register Write (RW) command 500, an Extended Register Write (ERW) command 520 and an extended register write long (ERWL) command 540. The datagram structures are defined by RFFE protocols, and can be used to efficiently write data to registers within the addressable register address range of a slave device. The RW command 500, the ERW command 520 and the ERWL command 540 each commences with transmission of a two-bit sequence start condition (SSC 502, 522, 542) followed by a four-bit device ID 504, 524, 544. The 4-bit device ID 504, 524, 544 provides 16 slave addresses, of which one slave address is reserved as a broadcast address, limiting direct addressing capability of the bus master device to 15 devices. A nine-bit command field 506, 526, 546 is transmitted next. In the RW command 500, the nine-bit command field 506 includes a three-bit command code 512, a five-bit address field 514 and a parity bit. In the ERW command 520, the nine-bit command field 526 is occupied by an eight-bit command code and a parity bit and followed by an address field 528 that carries an eight-bit register address and a parity bit. In the ERWL command 540, the nine-bit command field 546 is occupied by an eight-bit command code and a parity bit and followed by an address field 548 that carries a sixteen-bit register address and a parity bit. In the RW command 500, a data field 508 carries a single data byte. In the ERW command 520, the data field 530 carries up to 16 data bytes. In the ERWL command 540, the data field 530 carries up to 8 data bytes. Each data byte is transmitted with a parity bit. Bus park signaling 510, 532, 552 terminates the command 500, 520, 540.

FIG. 6 illustrates a memory map 600 that summarizes the structure of the register space addressable through a serial bus that is operated in accordance with certain RFFE protocols. RFFE protocols define a register space with an addressable range of 64K that can be assigned to registers and/or memory used by applications. The register space is organized into 256 pages, identified by a page number 602. Each page includes 256 addressable registers.

RFFE standards specify certain areas of the register space that can be reserved for control and/or configuration uses in some application or in all applications. Certain registers are reserved for compliancy, inter-operability, ease of access and for other reasons. For example, the RFFE specification reserves and/or identifies a set of registers (the RFFE registers 606) for special usage in the address region of 0x001C to 0x003F (36 registers). The RFFE registers 606 are located in Page-00 604 at the lower address region of the 64 KB address space (0x0000 to 0xFFFF) and are accessible using the RW command 500 and a corresponding Register Read command, which can address registers within the 0x0000 to 0x001F address range. The ERW command 520 and a corresponding Extended Register Read command can address registers within the 0x0000 to 0x00FF address range. The availability of these commands can be used to meet requirements for fast access and lower latency in accessing certain registers in the RFFE registers 606.

Address Range in Serial Buses

Conventional RFFE and SPMI protocols support a four bit a device address. Accordingly, 16 addresses are available to be used as unique slave identifiers (USIDs) and group slave identifiers (GSIDs) in addition to one or more addresses reserved by protocol. In one example, address 0b0000 is reserved for use as a broadcast address, and the remaining 15 slave addresses in the range {0b0001-0b1111} permit a maximum of 15 slave devices to be active on a serial bus operated in accordance with RFFE and SPMI protocols. Advances in technology and increased complexity of apparatus, including mobile communications apparatus, may result in larger numbers of slave devices to be controlled by an application processor, modem or controller. In one example, growth in RF front-end complexity in 5G and later radio access technologies may result in a need to support more than 15 devices on a single RFFE bus is highly desired. In another example, certain applications may wish to assign multiple USIDs to one or more slave devices. In another example, one or more of the available addresses may be allocated for use as GSIDs that enable an application processor, modem or controller to write concurrently to multiple slave devices. In these and other examples, demand for addresses can exceed availability even though the serial bus is capable of supporting significantly greater loads than the load of 15 slave devices.

Figure 7:
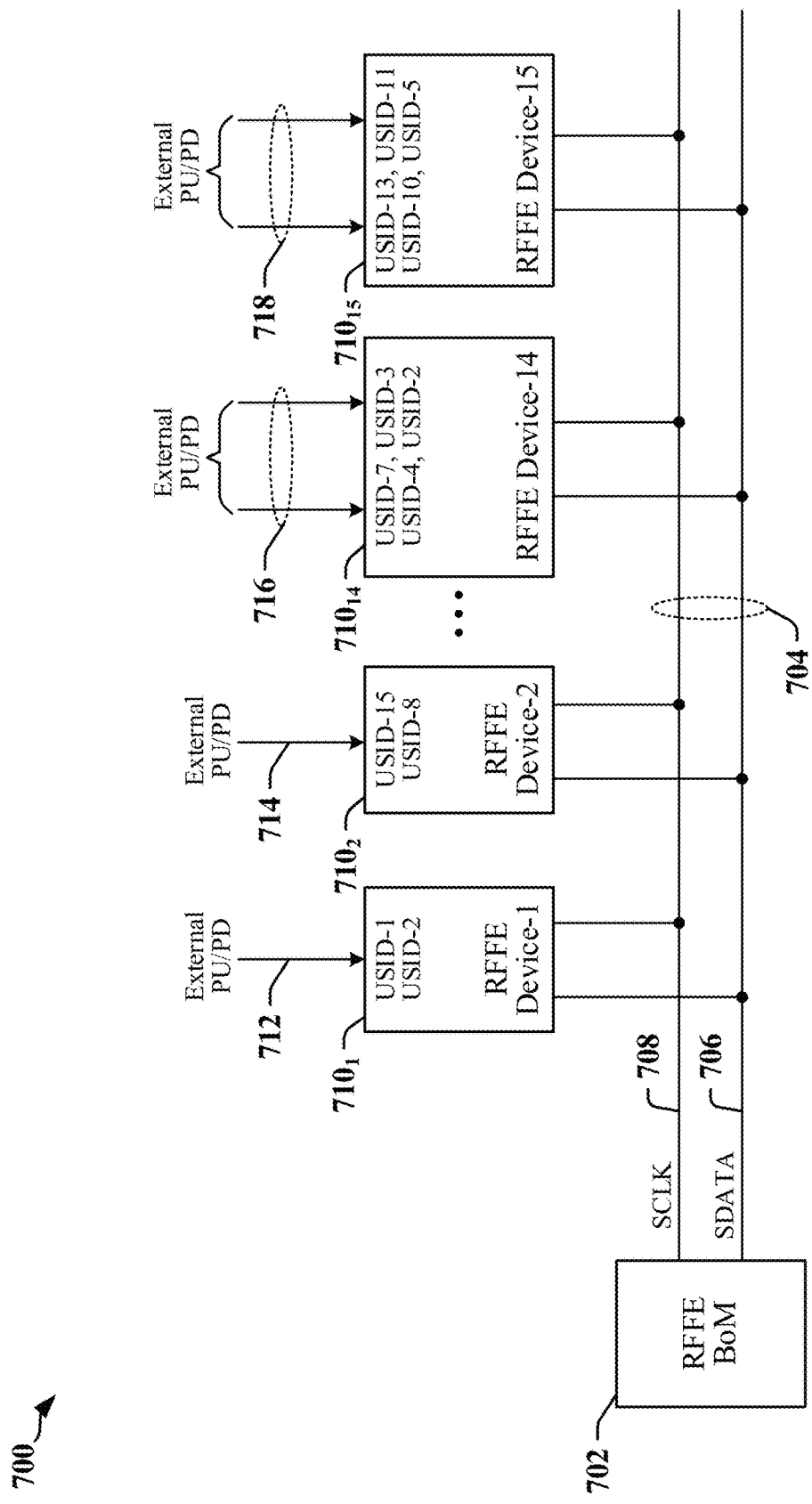
FIG. 7 illustrates an apparatus that includes a serial bus that is operated in accordance with RFFE protocols.

In some serial bus implementations, additional addresses may be provided through the use of external signaling. FIG. 7 illustrates an apparatus 700 that includes a serial bus 704 that is operated in accordance with RFFE protocols. Operation of the serial bus 704 is controlled by a bus owner/master (BoM) and includes an SDATA line 706 which carries data encoded in accordance with a clock signal carried on the SCLK line 708. The RFFE protocols define a 4-bit address, of which one address is used as a broadcast address. In the illustrated example, the remaining 15 addresses are used to select between 15 slave devices $710_1$-$710_{15}$. More than 15 addresses can be used when external address signals 712, 714, 716, 718 are provided by the bus master.

In the illustrated example, two slave devices $710_1$, $710_2$ each has an identifier-selection input (ID Pin) that receives a single external address signal 712, 714 and two slave devices $710_{14}$, $710_{15}$ receive at least two external address signals 716, 718. A first external address signal 712 enables a first slave device $710_1$ to respond to two addresses, a second external address signal 714 enables a second slave device $710_2$ to respond to two addresses, a first pair of external address signals 716 enables a third slave device $710_{14}$ to respond to four addresses, and a second pair of external address signals 718 enables a fourth slave device $710_{15}$ to respond to four addresses. The first external address signal 712 and the second external address signal 714 may be the same or different, and the first pair of external address signals 716 and the second pair of external address signals 718 may be identical or different. One or more of the external address signals 712, 714 may be included in the first pair of external address signals 716 and/or the second pair of external address signals 718. In the illustrated example, a GSID (USID-2) is assigned to the first slave device $710_1$ and to the third slave device $710_{14}$.

The provision of ID Pins on the RFFE slave devices $710_1$, $710_2$, $710_{14}$, $710_{15}$ offers some flexibility in device address assignment, but does not increase the maximum number of slave devices that can be individually addressed on the serial bus. The use of ID Pins does not offset the reduction in available addresses due to the use of GSIDs.

Certain aspects of this disclosure relate to techniques that enable additional slave devices to be connected to a single serial bus, and that can compensate for a reduction in the number of available addresses when one or more GSIDs are assigned. According to certain aspects, existing RFFE protocols can be leveraged to expand addressing capabilities and to increase the number of slave devices that can be concurrently connected to the serial bus, while maintaining compatibility with bus protocols, and/or while providing for coexistence with conventional slave devices. Certain examples described herein relate to RFFE protocols, although the disclosed concepts are applicable to various protocols, including RFFE and SPMI protocols.

An encapsulation protocol provided in accordance with certain aspects of this disclosure supports an 8-bit slave address that can be preassigned or programmed during system initialization or operation. The encapsulation protocol enables encapsulated information to be transmitted over the serial bus to a device responding to the 8-bit slave address provided in the encapsulated information. The encapsulation protocol may use a datagram defined by the bus protocol to transport the encapsulated information.

Figure 8:
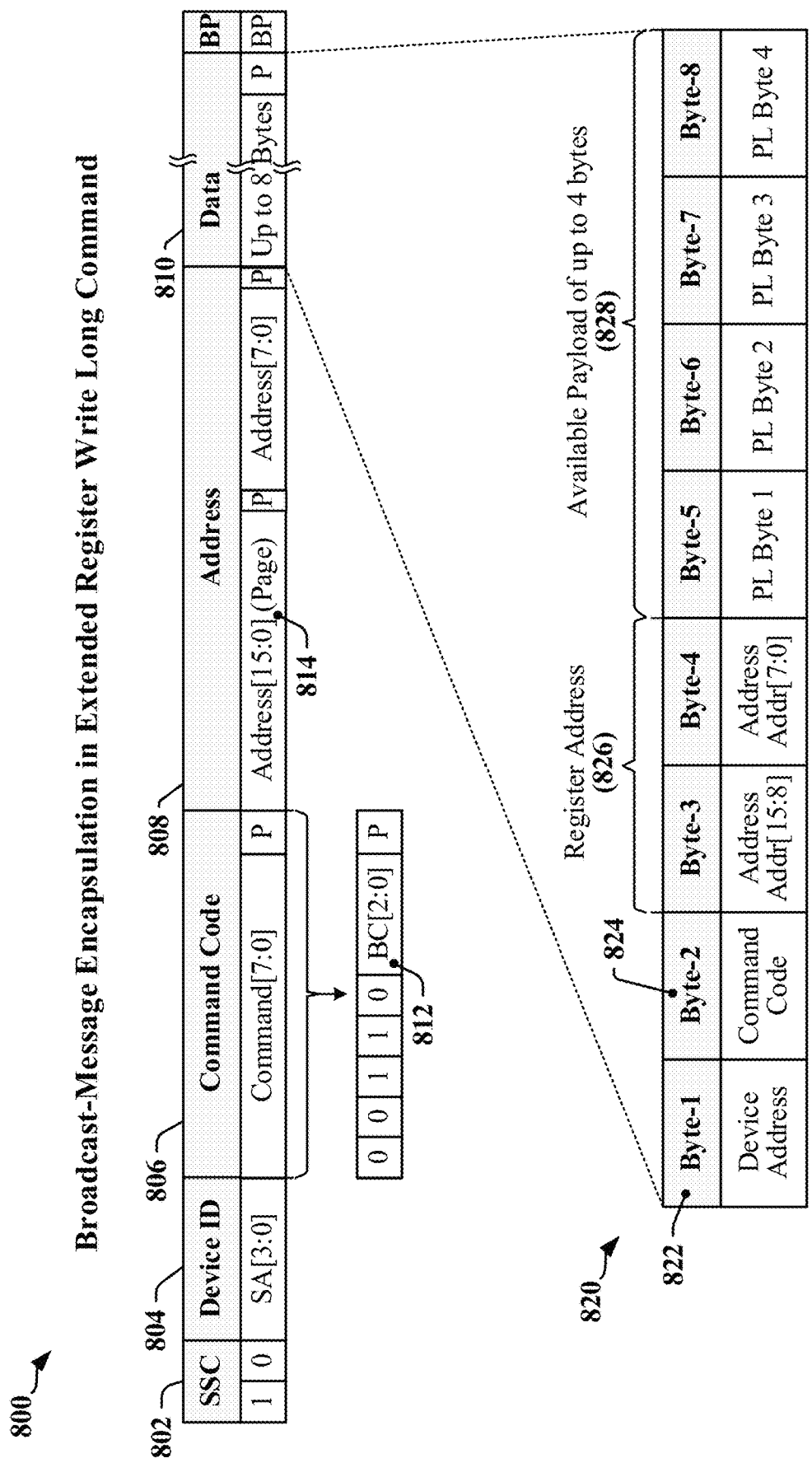
FIG. 8 illustrates a first example of a datagram that may be used to access registers in an extension page in accordance with certain aspects disclosed herein.

FIG. 8 illustrates the use of an RFFE extended register write long command 800 to encapsulate messages. Other types of datagram may be used. The RFFE extended register write long command 800 can be transmitted as a broadcast command. Broadcast is indicated by providing 0b0000 in the address field 804 that is transmitted after the SSC 802. The command code 806 is transmitted next, where the 5-bit command field [C7:C3] is set to 0b00110 indicating "extended register write long", followed by a 3-bit byte count 812 indicating the size of the data payload 810.

The command code 806 in an extended register write long datagram is followed in transmission by a 16-bit register address 808. In accordance with certain aspects of this disclosure, the value of the first byte 814 of the 16-bit register address 808 can be used as an 8-bit encapsulation key that signifies that the data payload 810 includes data for a conventional write command or that an encapsulation protocol that has been used to configure the data payload 810. In one example, a conventional write command is to be performed when the first byte 814 of the 16-bit register address 808 indicates a valid page number 602 (see FIG. 6), such as Page-00 604. In another example, an encapsulation protocol is indicated when the first byte 814 of the 16-bit register address 808 corresponds to an invalid or unused page of registers. A legacy slave device ignores write commands addressed to invalid pages and/or pages that are not implemented by the slave device. Legacy slave devices can be expected to correctly interpret conventional broadcast messages addressed to valid pages by the BoM. A slave device adapted in accordance with certain aspects of this disclosure may be configured to interpret the data payload 810 addressed to an invalid or unused page in accordance with an encapsulation protocol associated with the invalid or unused page that is identified in the first byte 814 of the 16-bit register address 808.

In one example, an encapsulated message 820 includes an 8-bit slave device address 822 that uniquely identifies a single slave device or that serves as a group identifier. The 8-bit slave device address 822 may be preassigned or programmed during system initialization or operation. The illustrated encapsulated message 820 includes an 8-bit command code 824 followed by a 2-byte (16-bit) register address 826 and a data payload 828 of up to 4 bytes in length.

The encapsulation protocol may support both read and write operations. In one example, the BoM may release the SDATA line after transmitting the register address 826 during a read transaction, to permit the addressed slave device to transmit data as the data payload 828 of the transaction. Encapsulated messages can include commands that are configurable to access the entire 64-Kbyte register space defined by protocol.

In many implementations, slave devices are configured to respond to Page-0 broadcasts, and to ignore broadcasts directed to the other 255 pages. Certain RFFE protocols reserve the uppermost pages (0xFE00-0xFEFF and 0xFF00-0xFFFF), and 253 page addresses are available to identify encapsulation protocols. In some instances, one or more pages may be used in slave devices that can handle the encapsulation protocols disclosed herein.

In certain implementations, the 16-bit register address 808 may serve as a 16-bit encapsulation key. The use of a 16-bit encapsulation key can provide greater address map flexibility, and can enable a BoM to direct encapsulated messages with greater precision to slave devices or groups of slave devices without causing unaddressed slave devices to process the encapsulated message. In some implementations, encapsulation protocols can be associated with regions of a 16-bit address space that need not correlate to a complete page or a specific page.

The encapsulation framework disclosed herein can enable new protocols to be defined. A logic circuit that detects a Broadcast-Message directed to a specific region in the user-defined space may be used to distinguish between legacy and encapsulated broadcast-messages.

Figure 9:
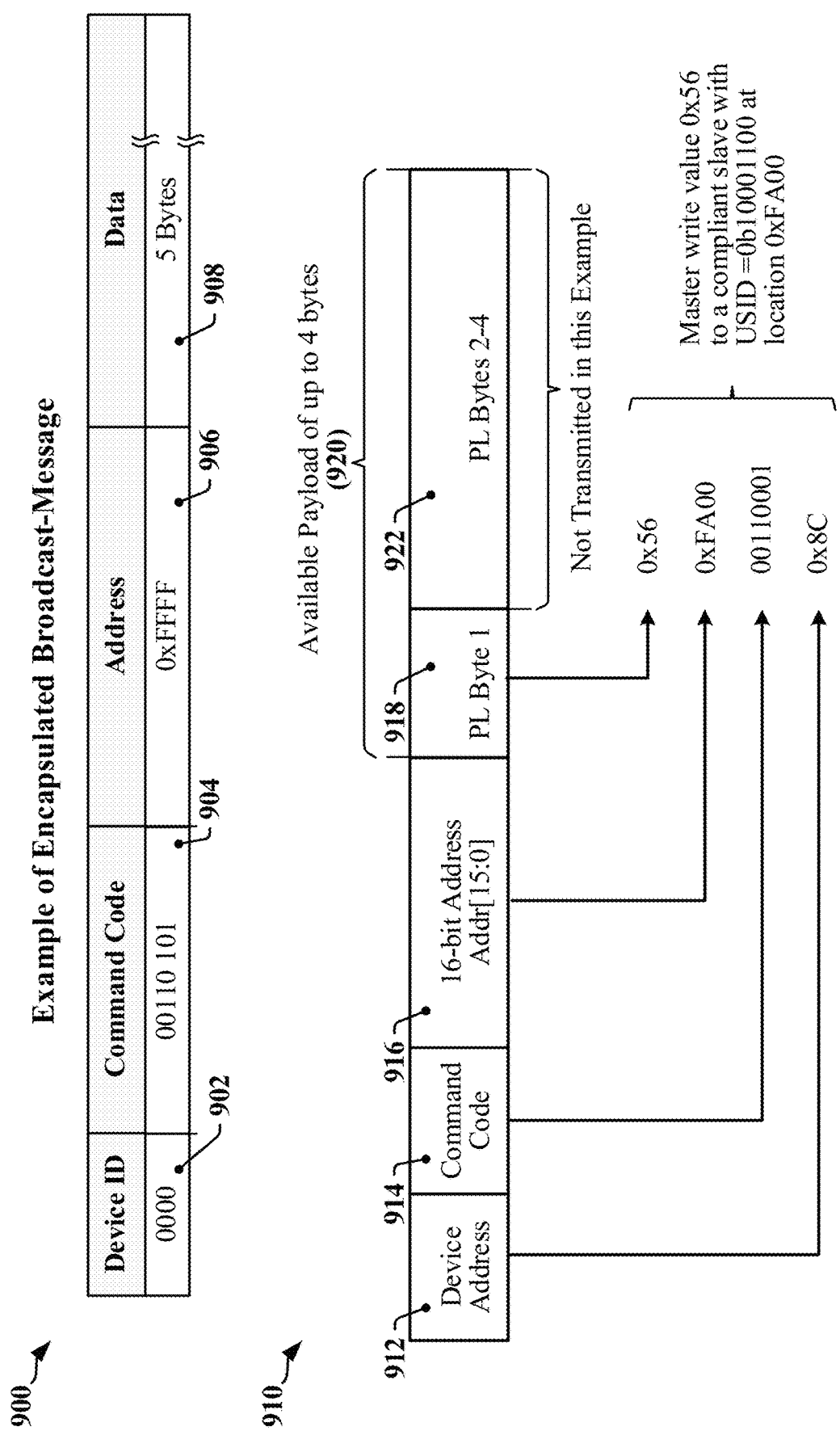
FIG. 9 illustrates a second example of branched-paging in accordance with certain aspects disclosed herein.

FIG. 9 illustrates an example in which a broadcast datagram 900 carries an encapsulated broadcast message 910 in accordance with certain aspects disclosed herein. The broadcast datagram 900 includes a command code 904 that corresponds to an RFFE extended register write long command, and the broadcast datagram 900 is transmitted to a broadcast address 902. The command code 904 specifies that the payload 908 includes or is limited to 5 data bytes. The encapsulated broadcast message 910 may be encoded in the payload 908 using an encapsulation protocol. Other types of datagram and/or command may be used to carry the encapsulated broadcast message 910 as desired or needed. A 16-bit register address 916 in the broadcast datagram 900 includes an encapsulation key that identifies the encapsulation protocol. In the illustrated broadcast datagram 900, the 16-bit register address 916 is set to 0xFFFF, which corresponds to an address reserved by RFFE protocols. The encapsulation key may be represented by different address values. In one example, the first byte of the 16-bit register address 906 serves as an 8-bit encapsulation key and has a value that corresponds to an invalid or unused page of registers in the targeted slave device. In another example, the 16-bit register address 906 includes an unreserved, invalid or unused register address that serves as a 16-bit encapsulation key.

The encapsulated broadcast message 910 includes an 8-bit slave address 912 that selects a slave to receive and/or respond to the information encapsulated in the payload 908. In the illustrated example, the 8-bit slave address 912 is set to 0b10011100 (0x8C). Slave devices that are capable of handling the encapsulation protocol may be configured with a slave address that is preassigned or preprogrammed. Slave addresses may be assigned during manufacture and/or system integration. Slave addresses may be programmed, configured or reconfigured during initialization, in response to a request generated by an application and/or after a hot-join event when the slave device becomes actively coupled to the serial bus. The 8-bit slave address 912 may be a unique slave identifier or a group slave identifier.

The encapsulated broadcast message 910 may include a command code 914. In some instances, the command code 914 may correspond closely to a command code defined by RFFE (or SPMI, etc.) protocols. In the illustrated example, the command code 914 is set to 0x31, which corresponds to an RFFE extended register write long command, with a single byte payload. In another example, the BoM may transmit a read command in the encapsulated broadcast message 910, where legacy slave devices ignore the encapsulated broadcast message 910 and where a slave device that has an address that corresponds to the 8-bit slave address 912 may respond by transmitting one or more bytes of data on the serial bus as the payload 918 of the encapsulated broadcast message 910. In another example, a BoM may transmit a broadcast command in the encapsulated broadcast message 910 by setting the 8-bit slave address 912 to 0x00. The broadcast command can be used to limit a broadcast write to devices that are capable of handling the encapsulation protocol. One or more slave devices may respond to the encapsulated broadcast message 910 by writing the payload 918 to memory commencing at the location identified by the 16-bit register address 916 for transmission as the payload 918.

The encapsulated broadcast message 910 includes a 16-bit register address 916 that identifies the first register address targeted by the command code 914. In the illustrated example, the 16-bit register address 916 identifies a first register at address 0xFA00. In some instances, the encapsulated broadcast message 910 includes an 8-bit register address, or a register address of a different size.

In the illustrated example, the encapsulated broadcast message 910 includes a payload 918 that is limited to a single byte. The conventional RFFE extended register write long command may be configured to serve as a broadcast datagram 900 that provides a data payload 908 that can include up to 8 bytes. The payload 908 includes encapsulation overhead amounting to 4 bytes, and the encapsulated broadcast message 910 can provide a possible 4-byte payload 920. In the illustrated example, a 3-byte portion 922 of the possible -byte payload 920 is not transmitted in the encapsulated broadcast message 910.

Figure 10:
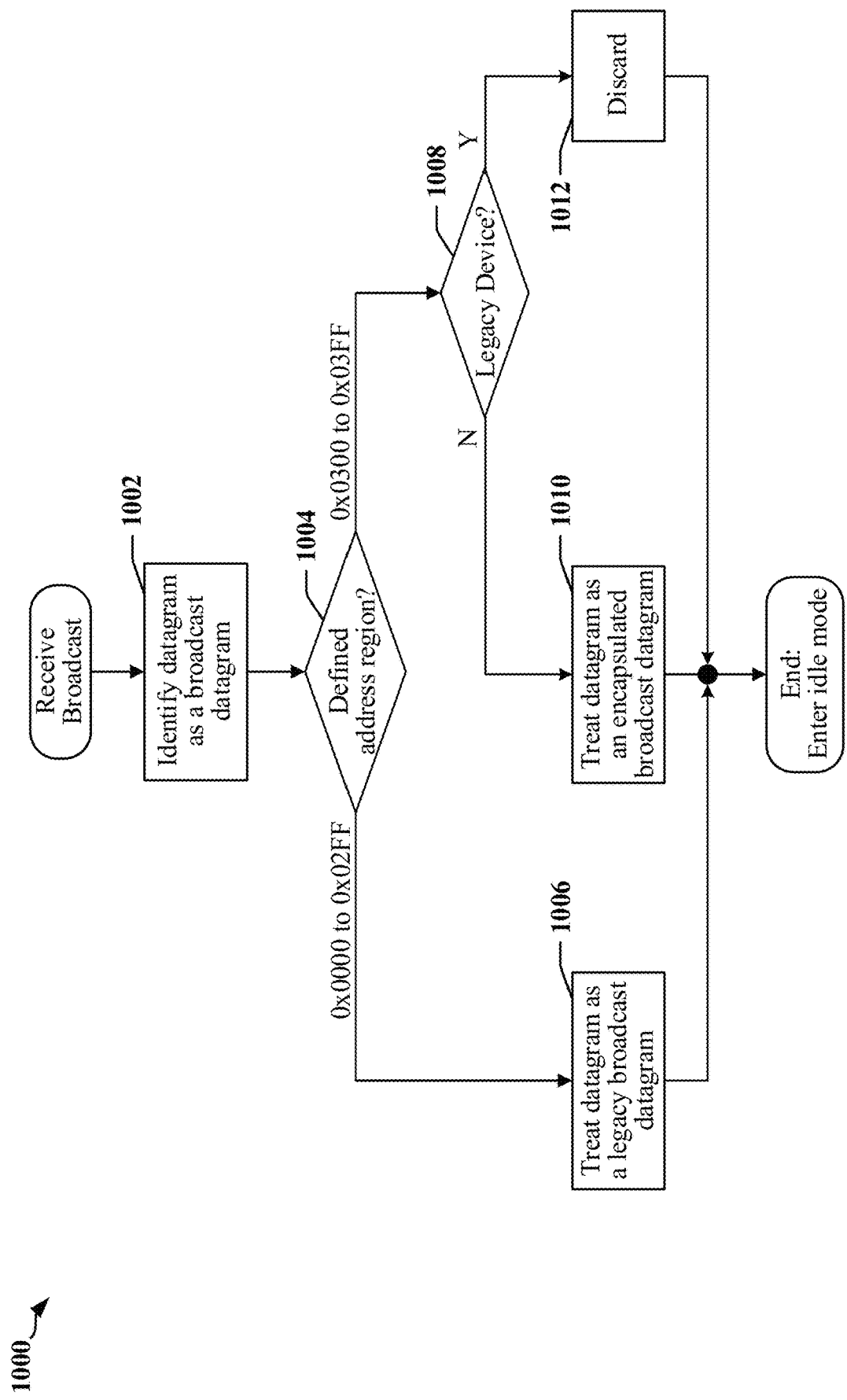
FIG. 10 illustrates a second example of a datagram that may be used to access registers in an extension page in accordance with certain aspects disclosed herein.

FIG. 10 is flowchart 1000 illustrating a method for receiving and decoding an encapsulated broadcast message. The method may be performed at a slave device coupled to a serial bus. In one example, the serial bus may be operated in accordance with an RFFE protocol. In another example, the serial bus may be operated in accordance with an SPMI protocol. In other examples, the serial bus may be operated in accordance with another bus protocol.

At block 1002, the slave device may receive a datagram from the serial bus that is configured as a broadcast command. The datagram may include a write command code and an address reserved for broadcast transactions. In one example, the address has a zero value. The datagram may also include a register address in a field that indicates a first register location to be written. At block 1004, the slave device may determine if the register address is a valid address and/or points to a valid address space. A valid address may be used to access a physically-present register location that can be written and/or read in compliance with bus protocols. Invalid address spaces include addresses that are reserved by protocol, that do not have a corresponding accessible register, and/or are in an address space that is not decodable by the slave device. In the illustrated example, a valid address space lies within the range {0x0000-0x02FF} and an invalid address space lies within the range {0x0300-0x03FF}.

When the slave device determines at block 1004 that the register address lies within the {0x0000-0x02FF} range, then the slave device may treat the datagram as a conventional or legacy broadcast datagram at block 1006. When the slave device determines at block 1004 that the register address lies within the {0x0300-0x03FF} range, then the method continues at block 1008.

At block 1008, a legacy slave device may recognize the register address to be an invalid address and may discard the datagram at block 1012. At block 1008, a slave device configured in accordance with certain aspects disclosed herein may determine that the datagram carries an encapsulated broadcast message and may process the encapsulated message at block 1010.

Examples of Processing Circuits and Methods

Figure 11:
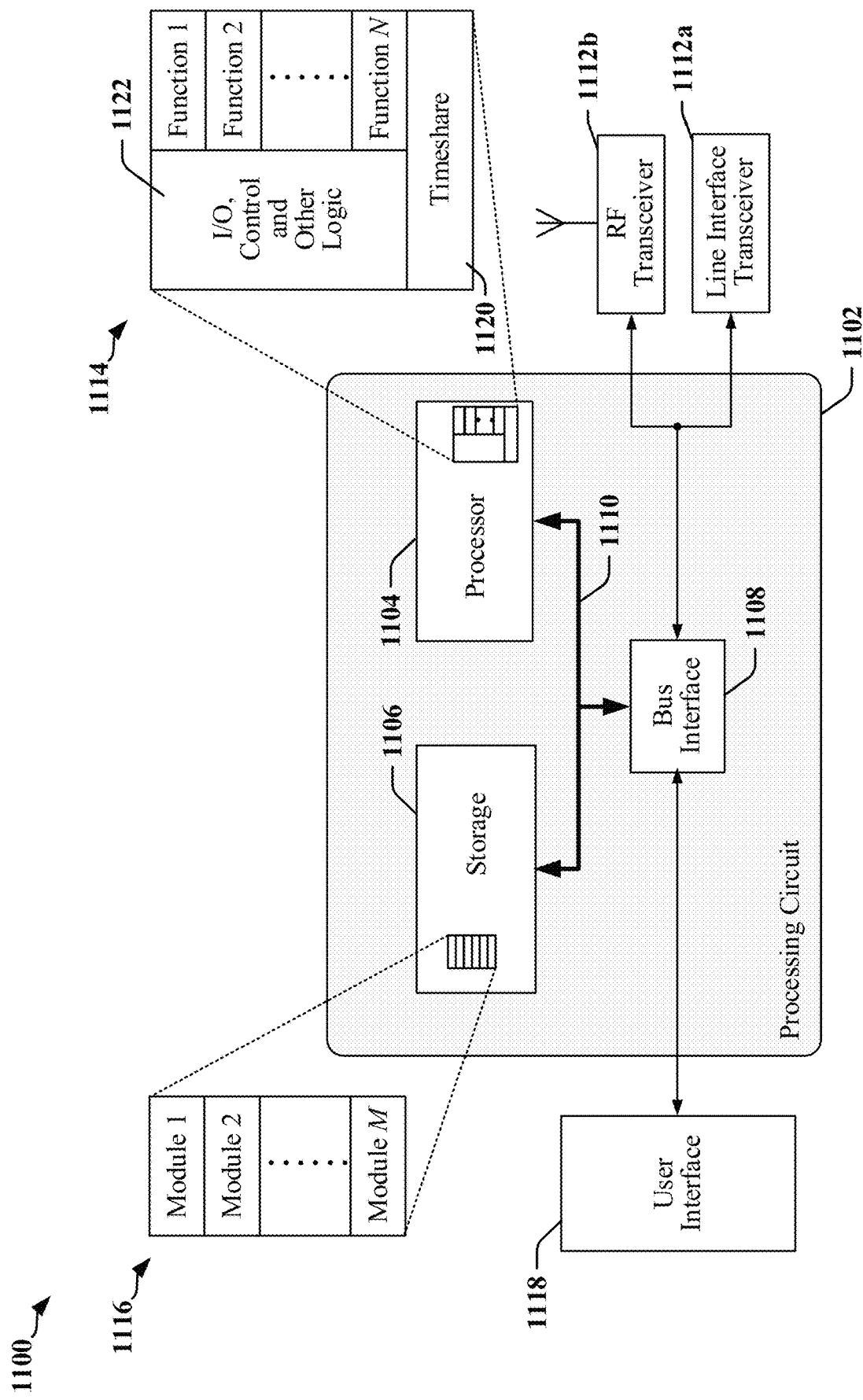
FIG. 11 illustrates one example of an apparatus employing a processing circuit that may be adapted according to certain aspects disclosed herein.

FIG. 11 is a diagram illustrating an example of a hardware implementation for an apparatus 1100. In some examples, the apparatus 1100 may perform one or more functions disclosed herein. In accordance with various aspects of the disclosure, an element, or any portion of an element, or any combination of elements as disclosed herein may be implemented using a processing circuit 1102. The processing circuit 1102 may include one or more processors 1104 that are controlled by some combination of hardware and software modules. Examples of processors 1104 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1104 may include specialized processors that perform specific functions, and that may be configured, augmented or controlled by one of the software modules 1116. The one or more processors 1104 may be configured through a combination of software modules 1116 loaded during initialization, and further configured by loading or unloading one or more software modules 1116 during operation.

In the illustrated example, the processing circuit 1102 may be implemented with a bus architecture, represented generally by the bus 1110. The bus 1110 may include any number of interconnecting buses and bridges depending on the specific application of the processing circuit 1102 and the overall design constraints. The bus 1110 links together various circuits including the one or more processors 1104, and storage 1106. Storage 1106 may include memory devices and mass storage devices, and may be referred to herein as computer-readable media and/or processor-readable media. The bus 1110 may also link various other circuits such as timing sources, timers, peripherals, voltage regulators, and power management circuits. A bus interface 1108 may provide an interface between the bus 1110 and one or more transceivers 1112a, 1112b. A transceiver 1112a, 1112b may be provided for each networking technology supported by the processing circuit. In some instances, multiple networking technologies may share some or all of the circuitry or processing modules found in a transceiver 1112a, 1112b. Each transceiver 1112a, 1112b provides a means for communicating with various other apparatus over a transmission medium. In one example, a transceiver 1112a may be used to couple the apparatus 1100 to a multi-wire bus. In another example, a transceiver 1112b may be used to connect the apparatus 1100 to a radio access network. Depending upon the nature of the apparatus 1100, a user interface 1118 (e.g., keypad, display, speaker, microphone, joystick) may also be provided, and may be communicatively coupled to the bus 1110 directly or through the bus interface 1108.

A processor 1104 may be responsible for managing the bus 1110 and for general processing that may include the execution of software stored in a computer-readable medium that may include the storage 1106. In this respect, the processing circuit 1102, including the processor 1104, may be used to implement any of the methods, functions and techniques disclosed herein. The storage 1106 may be used for storing data that is manipulated by the processor 1104 when executing software, and the software may be configured to implement any one of the methods disclosed herein.

One or more processors 1104 in the processing circuit 1102 may execute software.

Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1106 or in an external computer-readable medium. The external computer-readable medium and/or storage 1106 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1106 may also include, by way of example, a carrier wave, a transmission line, and any other suitable medium for transmitting software and/or instructions that may be accessed and read by a computer. The computer-readable medium and/or the storage 1106 may reside in the processing circuit 1102, in the processor 1104, external to the processing circuit 1102, or be distributed across multiple entities including the processing circuit 1102. The computer-readable medium and/or storage 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1106 may maintain software maintained and/or organized in loadable code segments, modules, applications, programs, etc., which may be referred to herein as software modules 1116. Each of the software modules 1116 may include instructions and data that, when installed or loaded on the processing circuit 1102 and executed by the one or more processors 1104, contribute to a run-time image 1114 that controls the operation of the one or more processors 1104. When executed, certain instructions may cause the processing circuit 1102 to perform functions in accordance with certain methods, algorithms and processes described herein.

Some of the software modules 1116 may be loaded during initialization of the processing circuit 1102, and these software modules 1116 may configure the processing circuit 1102 to enable performance of the various functions disclosed herein. For example, some software modules 1116 may configure internal devices and/or logic circuits 1122 of the processor 1104, and may manage access to external devices such as a transceiver 1112a, 1112b, the bus interface 1108, the user interface 1118, timers, mathematical coprocessors, and so on. The software modules 1116 may include a control program and/or an operating system that interacts with interrupt handlers and device drivers, and that controls access to various resources provided by the processing circuit 1102. The resources may include memory, processing time, access to a transceiver 1112a, 1112b, the user interface 1118, and so on.

One or more processors 1104 of the processing circuit 1102 may be multifunctional, whereby some of the software modules 1116 are loaded and configured to perform different functions or different instances of the same function. The one or more processors 1104 may additionally be adapted to manage background tasks initiated in response to inputs from the user interface 1118, the transceiver 1112a, 1112b, and device drivers, for example. To support the performance of multiple functions, the one or more processors 1104 may be configured to provide a multitasking environment, whereby each of a plurality of functions is implemented as a set of tasks serviced by the one or more processors 1104 as needed or desired. In one example, the multitasking environment may be implemented using a timesharing program 1120 that passes control of a processor 1104 between different tasks, whereby each task returns control of the one or more processors 1104 to the timesharing program 1120 upon completion of any outstanding operations and/or in response to an input such as an interrupt. When a task has control of the one or more processors 1104, the processing circuit is effectively specialized for the purposes addressed by the function associated with the controlling task. The timesharing program 1120 may include an operating system, a main loop that transfers control on a round-robin basis, a function that allocates control of the one or more processors 1104 in accordance with a prioritization of the functions, and/or an interrupt driven main loop that responds to external events by providing control of the one or more processors 1104 to a handling function.

Figure 12:
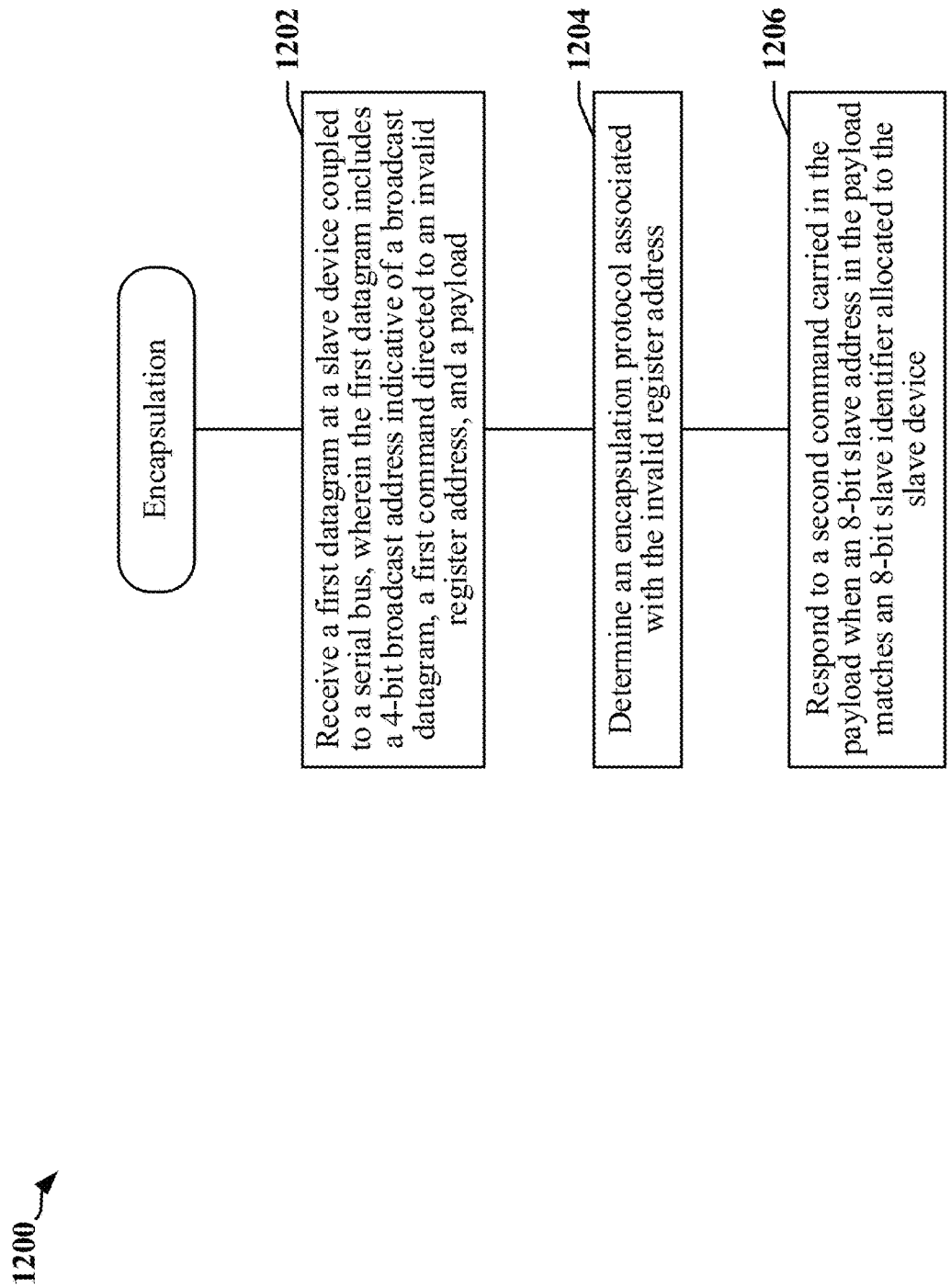
FIG. 12 is a flowchart that illustrates certain aspects disclosed herein.

FIG. 12 is a flowchart 1200 of a method that may be performed by a device coupled to a serial bus. In one example, the serial bus may be operated in accordance with an RFFE protocol. At block 1202, the device may receive a first datagram at a slave device coupled to a serial bus. The first datagram may include a 4-bit broadcast address indicative of a broadcast datagram, a first command directed to an invalid register address, and a payload. At block 1204, the device may determine an encapsulation protocol associated with the invalid register address. At block 1206, the device may respond to a second command carried in the payload when an 8-bit slave address in the payload matches an 8-bit slave identifier allocated to the slave device.

In one example, the invalid register address indicates a page of registers that is unimplemented in the slave device or points to a memory location that is unavailable for reading or writing. Legacy slave devices may not include decoding logic that responds to register addresses that correspond to an unimplemented page of registers. In some instances, a slave device implemented, adapted or configured to handle the encapsulation protocol may have a decoder that generates an event flag and/or interrupt. In some instances, a slave device implemented, adapted or configured to handle the encapsulation protocol may use the invalid register address as an index to a lookup table that selects the encapsulation protocol from multiple available encapsulation protocols.

In one example, the serial bus is operated in accordance with an RFFE protocol. In another example, the serial bus is operated in accordance with an SPMI protocol. In some implementations, each bit of the 4-bit broadcast address has a zero value. In some implementations, the second command is defined by an RFFE or SPMI protocol. In some implementations, the second command is defined by the encapsulation protocol.

In one example, the type, structure and format of the second command may correspond to the type, structure and format of one or more commands defined by the protocol used to control operation of the serial bus. In one example, the type, structure and format of the second command may be different from the type, structure and format of commands defined by the protocol used to control operation of the serial bus.

In certain implementations, a slave device may respond to an encapsulated write command by writing a data byte received in the payload to a target register address provided in the payload. The slave device may respond to an encapsulated read command by reading a data byte from a register identified by a target address provided in the payload when the command is a read command, and transmitting the data byte over the serial bus as part of the payload. In one example, the BoM (e.g., the master device 202 of FIG. 2) may release the data line 216 after transmitting an encapsulated command, slave address and register address in the payload of an encapsulated broadcast message (see FIG. 9, for example). The BoM may release the data line 216 by causing a line driver/receiver 214*a* to enter a high impedance state allowing sufficient time for the slave device (e.g., slave device 222$_0$ of FIG. 2) to cause its line driver/receiver 244*a* to enter an active state.

In some instances, the slave device may receive a second datagram, where the second datagram includes the 4-bit broadcast address and a write command directed to a valid register address. The slave device may use the valid register address to write payload data to one or more registers. In this instance, legacy slave devices may also use the valid register address to write payload data to one or more registers.

Figure 13:
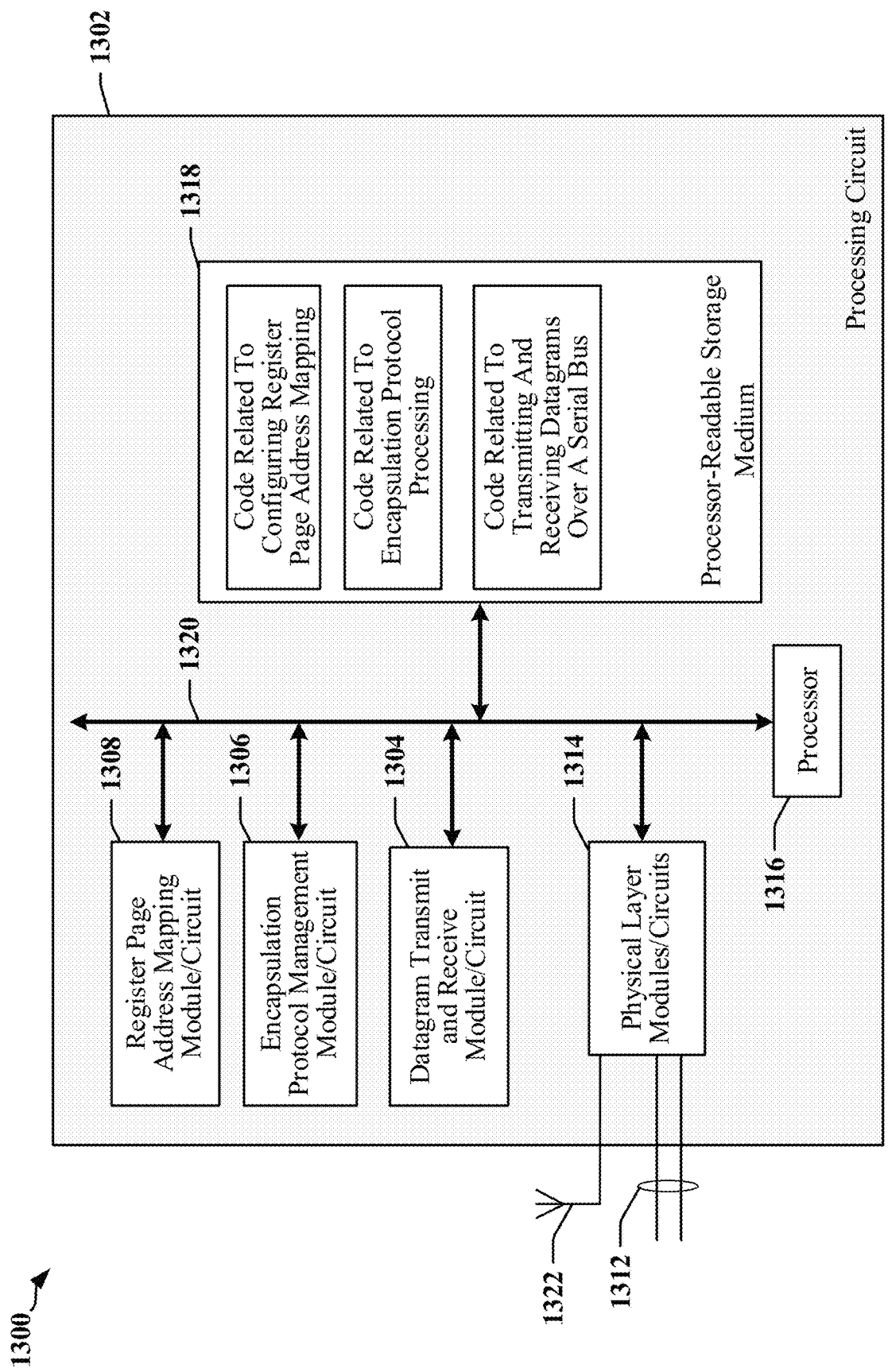
FIG. 13 illustrates an example of a hardware implementation for an apparatus adapted in accordance with certain aspects disclosed herein.

FIG. 13 is a diagram illustrating a simplified example of a hardware implementation for an apparatus 1300 employing a processing circuit 1302. The processing circuit typically has a controller or processor 1316 that may include one or more microprocessors, microcontrollers, digital signal processors, sequencers and/or state machines. The processing circuit 1302 may be implemented with a bus architecture, represented generally by the bus 1320. The bus 1320 may include any number of interconnecting buses and bridges depending on the specific application of the processing circuit 1302 and the overall design constraints. The bus 1320 links together various circuits including one or more processors and/or hardware modules, represented by the controller or processor 1316, the modules or circuits 1304, 1306 and 1308 and the processor-readable storage medium 1318. One or more physical layer circuits and/or modules 1314 may be provided to support communication over a communication link implemented using a multi-wire bus 1312, through an antenna or antenna array 1322 (to a radio access network for example), and so on. The bus 1320 may also link various other circuits such as timing sources, peripherals, voltage regulators, and power management circuits, which are well known in the art, and therefore, will not be described any further.

The processor 1316 is responsible for general processing, including the execution of software, code and/or instructions stored on the processor-readable storage medium 1318. The processor-readable storage medium 1318 may include a non-transitory storage medium. The software, when executed by the processor 1316, causes the processing circuit 1302 to perform the various functions described supra for any particular apparatus. The processor-readable storage medium 1318 may be used for storing data that is manipulated by the processor 1316 when executing software. The processing circuit 1302 further includes at least one of the modules 1304, 1306 and 1308. The modules 1304, 1306 and 1308 may be software modules running in the processor 1316, resident/stored in the processor-readable storage medium 1318, one or more hardware modules coupled to the processor 1316, or some combination thereof. The modules 1304, 1306 and 1308 may include microcontroller instructions, state machine configuration parameters, or some combination thereof.

In one configuration, the apparatus 1300 includes modules and/or circuits 1308 adapted to manage memory map configuration. The apparatus 1300 may include modules and/or circuits 1306 adapted to handle one or more encapsulation protocols, and modules and/or circuits 1304 adapted to configure, conduct and/or participate in transactions over the multi-wire bus 1312 configured to operate as an RFFE, SPMI or other serial bus.

In certain implementations, the apparatus 1300 includes physical layer circuits and/or modules 1314 that implement an interface circuit adapted to couple the apparatus 1300 to the multi-wire bus 1312. The apparatus 1300 may have a processor 1316 configured to receive a first datagram at a slave device coupled to the multi-wire bus 1312. The first datagram may include a 4-bit broadcast address indicative of a broadcast datagram, a first command directed to an invalid register address, and a payload. The processor 1316 may be configured to determine an encapsulation protocol associated with the invalid register address, and respond to a second command carried in the payload when an 8-bit slave address in the payload matches an 8-bit slave identifier allocated to the slave device.

In some examples, the invalid register address indicates a page of registers that is unimplemented in the slave device or points to a memory location that is unavailable for reading or writing. Legacy slave devices may not include decoding logic that responds to register addresses that correspond to an unimplemented page of registers. In some instances, a slave device implemented, adapted or configured to handle the encapsulation protocol may have a decoder that generates an event flag and/or interrupt. In some instances, a slave device implemented, adapted or configured to handle the encapsulation protocol may use the invalid register address as an index to a lookup table that selects the encapsulation protocol from multiple available encapsulation protocols.

In one example, the multi-wire bus 1312 is operated in accordance with an RFFE protocol. In another example, the multi-wire bus 1312 is operated in accordance with an SPMI protocol. In some instances, each bit of the 4-bit broadcast address has a zero value. In some instances, the second command is defined by an RFFE or SPMI protocol. In some instances, the second command is defined by the encapsulation protocol.

In one example, the type, structure and format of the second command may correspond to the type, structure and format of one or more commands defined by the protocol used to control operation of the multi-wire bus 1312. In one example, the type, structure and format of the second command may be different from the type, structure and format of commands defined by the protocol used to control operation of the multi-wire bus 1312.

In certain examples, a slave device may respond to an encapsulated write command by writing a data byte received in the payload to a target register address provided in the payload. The slave device may respond to an encapsulated read command by reading a data byte from a register identified by a target address provided in the payload when the command is a read command, and transmitting the data byte over the multi-wire bus 1312 as part of the payload. In one example, a bus master device may release a data line of the multi-wire bus 1312 after transmitting an encapsulated command, slave address and register address in the payload of an encapsulated broadcast message. The bus master device may release the data line by causing a line driver/receiver to enter a high impedance state allowing sufficient time for the slave device to cause its line driver/receiver to enter an active state.

In some instances, the slave device may receive a second datagram, where the second datagram includes the 4-bit broadcast address and a write command directed to a valid register address. The slave device may use the valid register address to write payload data to one or more registers. In this instance, legacy slave devices may also use the valid register address to write payload data to one or more registers.

The processor-readable storage medium 1318 may include transitory or non-transitory storage devices configured to store code, instructions and/or parameters used to implement one or more methods or procedures disclosed herein. The processor-readable storage medium 1318 may include code for receiving a first datagram at a slave device coupled to a multi-wire bus 1312. The first datagram may include a 4-bit broadcast address indicative of a broadcast datagram, a first command directed to an invalid register address, and a payload. The processor-readable storage medium 1318 may include code for determining an encapsulation protocol associated with the invalid register address, and responding to a second command carried in the payload when an 8-bit slave address in the payload matches an 8-bit slave identifier allocated to the slave device.

In one example, the invalid register address indicates a page of registers that is unimplemented in the slave device or points to a memory location that is unavailable for reading or writing. Legacy slave devices may not include decoding logic that responds to register addresses that correspond to an unimplemented page of registers. In some instances, a slave device implemented, adapted or configured to handle the encapsulation protocol may have a decoder that generates an event flag and/or interrupt. In some instances, a slave device implemented, adapted or configured to handle the encapsulation protocol may use the invalid register address as an index to a lookup table that selects the encapsulation protocol from multiple available encapsulation protocols.

In one example, the multi-wire bus 1312 is operated in accordance with an RFFE protocol.

In another example, the multi-wire bus 1312 is operated in accordance with an SPMI protocol. In some implementations, each bit of the 4-bit broadcast address has a zero value. In some implementations, the second command is defined by an RFFE or SPMI protocol. In some implementations, the second command is defined by the encapsulation protocol.

In one example, the type, structure and format of the second command may correspond to the type, structure and format of one or more commands defined by the protocol used to control operation of the multi-wire bus 1312. In one example, the type, structure and format of the second command may be different from the type, structure and format of commands defined by the protocol used to control operation of the multi-wire bus 1312.

In certain examples, a slave device may respond to an encapsulated write command by writing a data byte received in the payload to a target register address provided in the payload. The slave device may respond to an encapsulated read command by reading a data byte from a register identified by a target address provided in the payload when the command is a read command, and transmitting the data byte over the multi-wire bus 1312 as part of the payload. In one example, a bus master device may release a data line of the multi-wire bus 1312 after transmitting an encapsulated command, slave address and register address in the payload of an encapsulated broadcast message. The bus master device may release the data line by causing a line driver/receiver to enter a high impedance state allowing sufficient time for the slave device to cause its line driver/receiver to enter an active state.

In some instances, the slave device may receive a second datagram, where the second datagram includes the 4-bit broadcast address and a write command directed to a valid register address. The slave device may use the valid register address to write payload data to one or more registers. In this instance, legacy slave devices may also use the valid register address to write payload data to one or more registers.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method of data communication, comprising:
   receiving a first datagram at a slave device coupled to a serial bus, wherein the first datagram includes a 4-bit broadcast address indicative of a broadcast datagram, a first command directed to an invalid register address, and a payload;
   determining an encapsulation protocol associated with the invalid register address; and
   responding to a second command carried in the payload when an 8-bit slave address in the payload matches an 8-bit slave identifier allocated to the slave device.

2. The method of claim 1, wherein the invalid register address identifies a page of registers that is unimplemented in the slave device.

3. The method of claim 1, wherein the invalid register address identifies a memory location that is unavailable for reading or writing.

4. The method of claim 1, wherein the serial bus is operated in accordance with a Radio Frequency Front-End protocol and each bit of the 4-bit broadcast address has a zero value.

5. The method of claim 1, wherein the second command is defined by a Radio Frequency Front-End protocol.

6. The method of claim 1, wherein the first command is defined by a Radio Frequency Front-End protocol and the second command is defined by the encapsulation protocol.

7. The method of claim 1, wherein the first command is defined by a System Power Management Interface protocol.

8. The method of claim 1, further comprising:
   writing a data byte received in the payload to a target register address provided in the payload when the second command is a write command.

9. The method of claim 1, further comprising:
   reading a data byte from a register identified by a target address provided in the payload when the second command is a read command; and
   transmitting the data byte over the serial bus as part of the payload.

10. The method of claim 1, further comprising:
    receiving a second datagram at the slave device, the second datagram including the 4-bit broadcast address and a write command directed to a valid register address; and
    using the valid register address to write payload data to one or more registers.

11. An apparatus comprising:
    an interface circuit adapted to couple the apparatus to a serial bus; and
    a processor configured to:
      receive a first datagram, wherein the first datagram includes a 4-bit broadcast address indicative of a broadcast datagram, a first command directed to an invalid register address, and a payload;
      determine an encapsulation protocol associated with the invalid register address; and
      respond to a second command carried in the payload when an 8-bit slave address in the payload matches an 8-bit slave identifier allocated to the apparatus.

12. The apparatus of claim 11, wherein the invalid register address identifies a page of registers that is unimplemented in the apparatus.

13. The apparatus of claim 11, wherein the invalid register address identifies a memory location that is unavailable for reading or writing.

14. The apparatus of claim 11, wherein the serial bus is operated in accordance with a Radio Frequency Front-End protocol and each bit of the 4-bit broadcast address has a zero value.

15. The apparatus of claim 11, wherein the second command is defined by a Radio Frequency Front-End protocol.

16. The apparatus of claim 11, wherein the first command is defined by a Radio Frequency Front-End protocol and the second command is defined by the encapsulation protocol.

17. The apparatus of claim 11, wherein the first command is defined by a System Power Management Interface protocol.

18. The apparatus of claim 11, wherein the processor is further configured to:
    write a data byte received in the payload to a target register address provided in the payload when the second command is a write command.

19. The apparatus of claim 11, wherein the processor is further configured to:
    read a data byte from a register identified by a target address provided in the payload when the second command is a read command; and
    transmit the data byte over the serial bus as part of the payload.

20. The apparatus of claim 11, wherein the processor is further configured to:
    receive a second datagram, the second datagram including the 4-bit broadcast address and a write command directed to a valid register address; and
    use the valid register address to write payload data to one or more registers.

21. A non-transitory processor-readable storage medium comprising code for:
    receiving a first datagram at a slave device coupled to a serial bus, wherein the first datagram includes a 4-bit broadcast address indicative of a broadcast datagram, a first command directed to an invalid register address, and a payload;
    determining an encapsulation protocol associated with the invalid register address; and responding to a second command carried in the payload when an 8-bit slave address in the payload matches an 8-bit slave identifier allocated to the slave device.

22. The storage medium of claim 21, wherein the invalid register address identifies a page of registers that is unimplemented in the slave device, or to a memory location that is unavailable for reading or writing.

23. The storage medium of claim 21, wherein the serial bus is operated in accordance with a Radio Frequency Front-End protocol or a System Power Management Interface protocol.

24. The storage medium of claim 21, wherein the second command is defined by the encapsulation protocol.

25. The storage medium of claim 21, further comprising code for:
   writing a first data byte received in the payload to a target register address provided in the payload when the second command is a write command; and
   when the second command is a read command,
      reading a second data byte from a register identified by a target address provided in the payload, and
      transmitting the second data byte over the serial bus as part of the payload.

26. An apparatus comprising:
   means for receiving datagrams from a serial bus, configured to receive a first datagram, wherein the first datagram includes a 4-bit broadcast address indicative of a broadcast datagram, a first command directed to an invalid register address, and a payload;
   means for determining an encapsulation protocol associated with the invalid register address; and
   means for responding to a second command carried in the payload when an 8-bit slave address in the payload matches an 8-bit slave identifier allocated to the apparatus.

27. The apparatus of claim 26, wherein the invalid register address identifies a page of registers that is unimplemented in the apparatus, or to a memory location that is unavailable for reading or writing.

28. The apparatus of claim 26, wherein the serial bus is operated in accordance with a Radio Frequency Front-End protocol or a System Power Management Interface protocol.

29. The apparatus of claim 26, wherein the second command is defined by the encapsulation protocol.

30. The apparatus of claim 26, wherein the means for responding to the second command is configured to:
   write a first data byte received in the payload to a target register address provided in the payload when the second command is a write command; and
   when the second command is a read command,
      read a second data byte from a register identified by a target address provided in the payload, and
      transmit the second data byte over the serial bus as part of the payload.

* * * * *